US009022422B2

(12) United States Patent
Nam

(10) Patent No.: US 9,022,422 B2
(45) Date of Patent: May 5, 2015

(54) SPOOL AIRBAG

(71) Applicant: CIS Tech, LLC, Novi, MI (US)

(72) Inventor: Jong S. Nam, Commerce Township, MI (US)

(73) Assignee: CIS Tech, LLC, Northville, MI (US)

( * ) Notice: Subject to any disclaimer, the term of this patent is extended or adjusted under 35 U.S.C. 154(b) by 0 days.

(21) Appl. No.: 13/795,733

(22) Filed: Mar. 12, 2013

(65) Prior Publication Data

US 2014/0097602 A1    Apr. 10, 2014

Related U.S. Application Data

(60) Provisional application No. 61/709,491, filed on Oct. 4, 2012.

(51) Int. Cl.
| B60R 21/231 | (2011.01) |
| B60R 21/2334 | (2011.01) |
| B60R 21/203 | (2006.01) |
| B60R 21/2338 | (2011.01) |

(52) U.S. Cl.
CPC ........... *B60R 21/231* (2013.01); *B60R 21/2338* (2013.01); *B60R 2021/23382* (2013.01)

(58) Field of Classification Search
CPC .............. B60R 21/203; B60R 21/2334; B60R 21/2238
USPC ..................... 280/731, 743.1, 743.2
See application file for complete search history.

(56) References Cited

U.S. PATENT DOCUMENTS

| 3,960,386 | A | | 6/1976 | Wallsten |
| 3,970,028 | A | | 7/1976 | Motai et al. |
| 5,312,132 | A | | 5/1994 | Pillet |
| 5,358,273 | A | * | 10/1994 | Onishi et al. ............... 280/743.1 |
| 5,358,827 | A | | 10/1994 | Garofalo et al. |
| 5,498,031 | A | | 3/1996 | Kosugi |
| 5,669,632 | A | | 9/1997 | Johnson et al. |
| 6,224,101 | B1 | | 5/2001 | Nishijima et al. |
| 6,241,283 | B1 | | 6/2001 | Zarazua |
| 6,832,778 | B2 | * | 12/2004 | Pinsenschaum et al. ..... 280/739 |
| 6,857,659 | B2 | * | 2/2005 | Webber ...................... 280/743.2 |
| 6,929,285 | B2 | * | 8/2005 | Yamada et al. ............ 280/743.2 |
| 7,195,275 | B2 | | 3/2007 | Abe |
| 7,198,286 | B2 | | 4/2007 | Kai |
| 7,506,892 | B2 | | 3/2009 | Klinkenberger et al. |
| 7,530,593 | B2 | | 5/2009 | Muller |
| 7,857,347 | B2 | | 12/2010 | Abe et al. |

(Continued)

FOREIGN PATENT DOCUMENTS

EP    2145803 A1    1/2010

*Primary Examiner* — Ruth Ilan
*Assistant Examiner* — Barry Gooden, Jr.
(74) *Attorney, Agent, or Firm* — Gifford, Krass, Sprinkle, Anderson & Citkowski, P.C.; Douglas L. Wathen

(57) ABSTRACT

A driver airbag cushion includes a front panel and a rear panel that are joined together along a joined perimeter to form an airbag cushion. The airbag cushion is shrunken in diameter along the joined perimeter by a means of a short rope, a group of pleats, or a group of short tethers to form a spool shaped airbag cushion when fully inflated with a recess along the perimeter outside the airbag cushion. The airbag volume is reduced by 20 to 30% while keeping or improving the effectiveness of the occupant protection. The inflator output is significantly reduced so that a low output single stage inflator can be used.

18 Claims, 9 Drawing Sheets

(56) References Cited

U.S. PATENT DOCUMENTS

| | | |
|---|---|---|
| 8,123,250 B2 | 2/2012 | Tanaka et al. |
| 2004/0026912 A1 | 2/2004 | Yamada et al. |
| 2004/0232682 A1 | 11/2004 | Keshavaraj et al. |
| 2005/0212276 A1* | 9/2005 | Yamada .................. 280/743.2 |
| 2005/0236823 A1* | 10/2005 | Schuetz .................. 280/743.2 |
| 2006/0249943 A1 | 11/2006 | Bauer et al. |
| 2007/0024043 A1 | 2/2007 | Abe |
| 2007/0205591 A1 | 9/2007 | Bito |
| 2011/0210533 A1 | 9/2011 | Adachi |
| 2011/0309605 A1 | 12/2011 | Kumagai |
| 2012/0205900 A1 | 8/2012 | Mallinger et al. |
| 2014/0265282 A1* | 9/2014 | Mann .................. 280/743.2 |

* cited by examiner

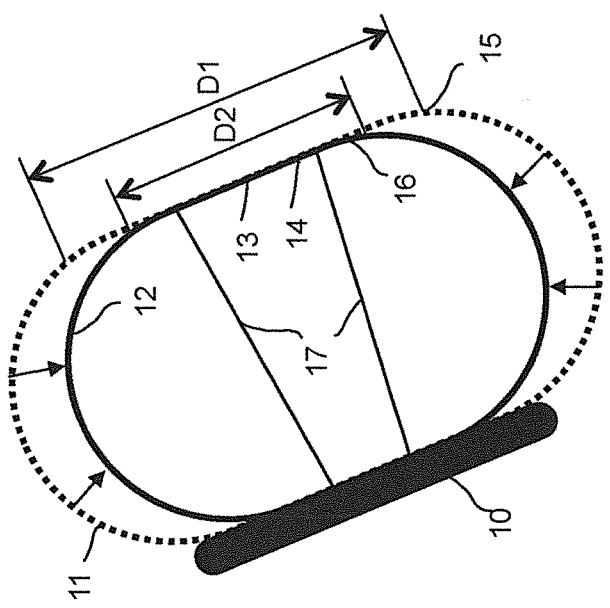

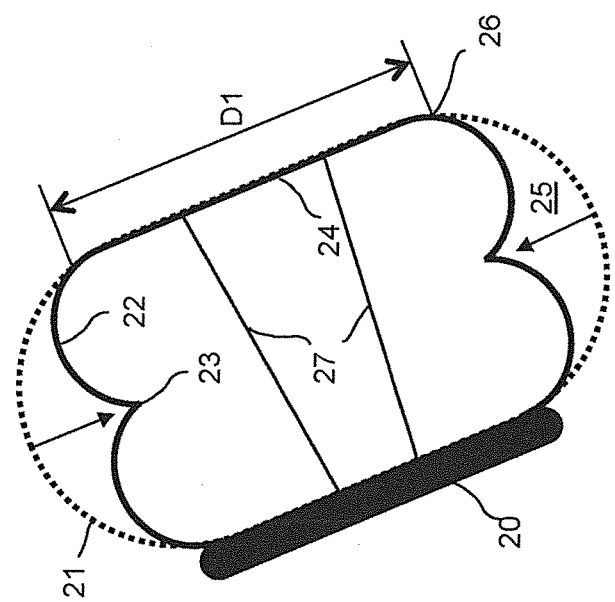

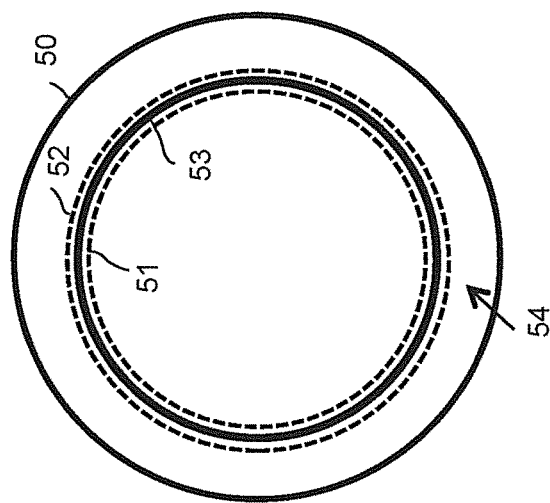
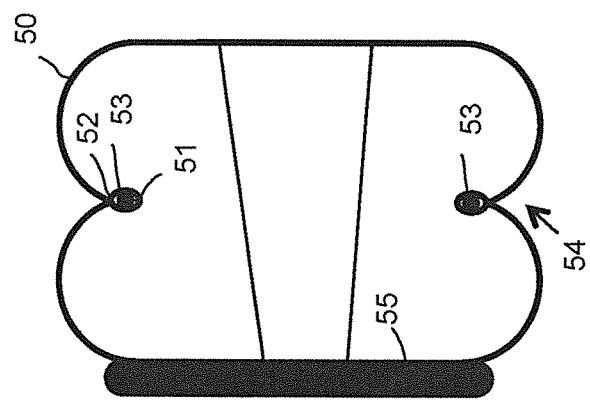

SPOOL AIRBAG

CROSS-REFERENCE TO RELATED APPLICATION

This application claims priority to U.S. provisional patent application Ser. No. 61/709,491, filed Oct. 4, 2012, the content of which is incorporated herein in its entirety.

FIELD OF THE INVENTION

This invention relates to a driver airbag system for use with a motor vehicle, wherein the airbag cushion is of a spool shape in such a way to effectively reduce the airbag volume, inflator output, cost, and weight while improving the occupant protection.

BACKGROUND OF THE INVENTION

A typical driver airbag is composed of two circular fabric panels that are sewn together along the perimeters to form an airbag cushion. The diameter of each panel typically ranges from 26 to 28 inches. After adding a tether, the cushion is inverted inside out through a hole at the center where an inflator will be installed. When the airbag cushion is fully inflated, the volume typically ranges from 55 to 60 liters, and the diameter of the inflated cushion along the perimeter ranges from 22 to 24 inches, whereas the steering wheel is approximately 15 inches in diameter. This large volume airbag requires a dual stage inflator that provides a high output to meet the high speed dynamic test requirements and a low output to meet the static test requirements. This driver airbag system with a dual stage inflator has created increased cost, weight, and complexity in safety development.

SUMMARY OF THE INVENTION

The traditional driver airbag system has a dual stage inflator, a circular front panel facing a driver occupant with a central region, a circular rear panel opposite to the front panel having a central region with a hole to allow a disk type gas generating inflator to be inserted, and a tether located at the central region of the front and rear panels. The function of the central tether is to control the shape of the airbag during and after the inflation. The tether makes the airbag cushion form a flat surface at the central region but can't help create a rounded shallow surface at the edge along the perimeter. The round edge of the airbag overhangs outside the steering wheel and forms a less effective area to restrain the occupant during a crash event.

The driver airbag system of the present invention improves the traditional driver airbag system by adding a means to reduce the airbag volume in such a way as to form the same amount of flat surface at the central region while reducing the ineffective overhang outside the steering wheel. The volume reduction is 20% to 30% such that a low output single stage inflator can be used and still can meet the high speed dynamic test requirements. The spool airbag can also reduce the chest deflection in a high speed dynamic test by further reducing the volume at the bottom of the airbag cushion. The airbag volume may be reduced simply by reducing the diameter of the circular front and rear panels but this method reduces the amount of flat surface at the central region.

In one embodiment of the present invention, the front and rear panels of the airbag cushion have an outer sewing line and an inner sewing line along the perimeter through which a short rope passes in between the outer and inner sewing lines in such a way as to shrink the diameter of the circular panels to approximately the size of a steering wheel. After adding the central tether, the airbag cushion is inverted inside out to form a final smooth airbag cushion in which the rope and tether are now inside the airbag cushion. By changing the density of wrinkles along the short rope, the radius of the airbag cushion at the bottom 6 o'clock can be further reduced to reduce the chest deflection during a high speed dynamic test.

In another embodiment of the present invention, the airbag has multiple pleats that are sewn along the perimeter where the front and rear panels are joined. The multiple pleats shrink the airbag cushion diameter along the perimeter to approximately the size of a steering wheel upon inflation. The pleats can be evenly distributed at every 15, 22.5, 30, 45, 60, or 90 degrees. By changing the size and spacing of the pleats, the radius of the airbag cushion at the bottom 6 o'clock can be further reduced to reduce the chest deflection during a high speed dynamic test.

In another embodiment of the present invention, the airbag has multiple hooks that are sewn along the perimeter where the front and rear panels are joined. A short rope is now inserted through the multiple hooks. The rope is much shorter than the circumference of the perimeter such that it shrinks the airbag cushion to approximately the size of a steering wheel in diameter upon inflation. The hooks can be evenly distributed at every 15, 22.5, 30, 45, 60, or 90 degrees. By changing the size and spacing of the hooks, the radius of the airbag cushion at the bottom 6 o'clock can be further reduced to reduce the chest deflection during a high speed dynamic test.

In another embodiment of the present invention, the airbag has short tethers that are connected on one end at the inflator region and on the other end at the perimeter where the front and rear panels are joined by stitching. The tethers are much shorter than the radius of the circular front and rear panels such that they shrink the airbag cushion to approximately the size of a steering wheel in diameter upon inflation. The tethers can be evenly distributed at every 15, 22.5, 30, 45, 60, or 90 degrees. The bottom tether(s) at or around 6 o'clock can be further shortened to reduce the radius of the bottom part of the airbag cushion and reduce the chest deflection during a high speed dynamic test.

BRIEF DESCRIPTION OF THE DRAWINGS

FIG. 1 is a cross sectional side view of a traditional airbag with a typical size and a smaller version airbag that is formed by reducing the diameter of the circular panels;

FIG. 2 is a cross sectional side view showing a comparison between a traditional airbag shape and an embodiment of the present invention in which the airbag cushion forms a spool shape in a side view after full inflation;

FIG. 5A is a cross sectional side view of an embodiment of the present invention in which the airbag cushion is formed using the approach shown in FIG. 4;

FIG. 5B is a front view of the embodiment of FIG. 5A;

DETAILED DESCRIPTION OF THE DRAWINGS

Figure 3B:
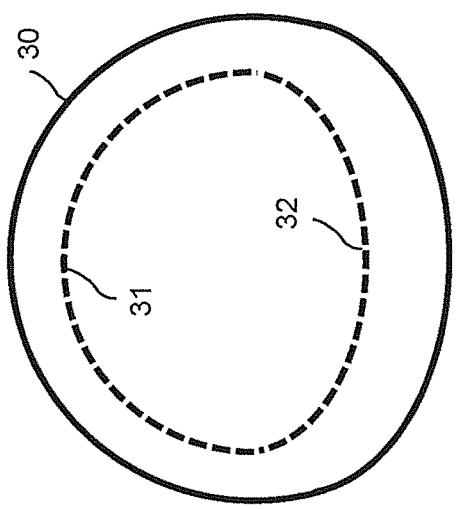
FIG. 3B is a front view of the embodiment of FIG. 3A.

FIG. 1 shows a traditional driver airbag 11 that is formed by typically sized circular panels. The typical size airbag 11 has a flat surface area 14 at the central region 13 of the airbag cushion formed by a tether 17. The size of the flat surface area D1 of the typical size airbag 11 is about the same as the size of a steering wheel 10. The flat surface area ends at 15 where the airbag cushion starts to curve around and overhangs outside the steering wheel. FIG. 1 also shows a smaller size airbag 12 that is formed by smaller diameter circular panels. The smaller size airbag 12 also has a flat surface area 14 that is smaller, as shown at D2, than the size of the steering wheel 10. The flat surface starts to curve around at 16 and becomes less effective in restraining an occupant in a crash event.

FIG. 2 compares a traditional airbag shape 21 with an embodiment of the present invention 22 that is mounted on a steering wheel 20. The traditional airbag has a flat surface 24 at the central region formed by a tether 27 and a rounded surface starting at the edge 26. The traditional airbag has a significant over-hang that extends outside the steering wheel 20. This over-hang with a rounded surface is not effective in restraining an occupant during a crash event. The embodiment of the present invention 22 reduces this ineffective over-hang while maintaining the size of the effective flat surface D1. The spool airbag of the present invention 22 has a recess area 25 along the perimeter 23 where the front and rear panels are joined. This may be referred to as a joined perimeter 23 of the airbag and the joined perimeter may be referred to as being shrunken. The airbag volume is reduced by 20% to 30% from the traditional airbag such that a low output single stage inflator may be used.

Figure 3A:
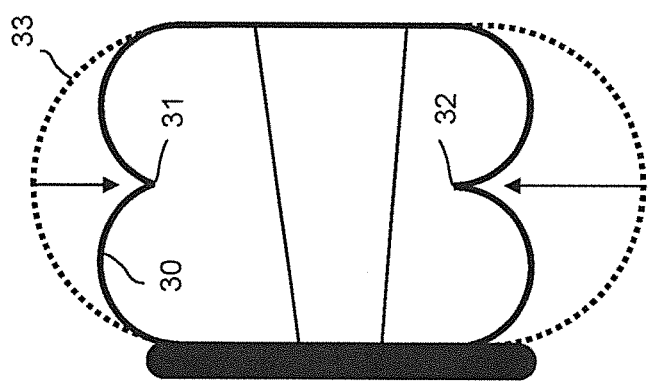
FIG. 3A is a cross sectional side view of an embodiment of the present invention in which the airbag cushion is more shrunken at the bottom than other areas to form an asymmetric airbag cushion shape.

FIGS. 3A and 3B show another embodiment of the present invention in which the spool shaped airbag cushion 30 is unevenly shrunken along the joined perimeter 32 as compared to a traditional airbag 33. In this embodiment, the bottom portion at 6 o'clock 32 is more shrunken than other portions 31 to create an asymmetric cushion shape, which can help reduce the chest deflection in a high speed crash event.

Figure 4:
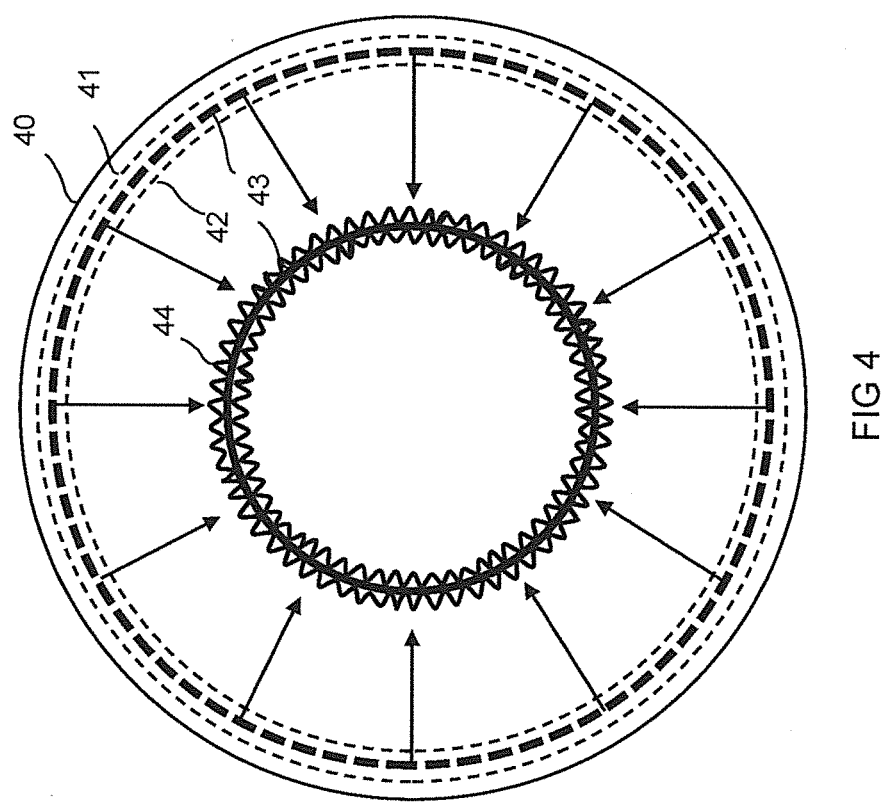
FIG. 4 is a front view of an embodiment of the present invention, illustrating an approach to creating the spool shape airbag cushion of the present invention in which the diameter of the front and rear panels of the airbag cushion are reduced by a short rope that goes through a space between an outer sewing line and an inner sewing along the perimeter.

FIG. 4 illustrates an approach for shrinking the traditional airbag cushion to form a spool airbag of the present invention, such as shown in FIG. 2. The front and rear panels 40 are overlapped on a flat surface and stitched together along an outer sewing line 41 and an inner sewing line 42. A space is defined between the inner sewing line 42 and outer sewing line 41. A rope 43 that is much shorter than the circumference of the joined perimeter goes through the space between the outer and inner sewing lines. The rope shrinks the diameter of the joined perimeter to a size approximately matching the steering wheel 20 in FIG. 2, by an action similar to pulling a string in a drawstring bag. This inward shrinking is indicated by the arrows in FIG. 4. This action creates wrinkles 44. The "rope" may take a variety of forms, including a cord, a string, or a webbing. After stitching and adding the rope, the airbag cushion may be turned inside-out or inverted, making the inner stitching line effectively and outer stitching line and vice-versa.

FIG. 5A shows a side view and FIG. 5B shows a front view of an embodiment of the present invention in which the airbag cushion 50 is formed using the approach shown in FIG. 4. The airbag cushion 50 has a recess area 54 along the joined perimeter 51. The recess is created by a short rope 53 that goes through the space created between the inner sewing line 51 (outer before the inversion) and the outer sewing line 52 (inner before). The diameter of a circle created by the rope is approximately the size of a steering wheel 55 (~15 inches) and the length is approximately the circumference of the steering wheel (~48 inches) to faun a spool shape airbag cushion 50. In some embodiments, the rope has a length in the range of 38 to 55 inches, thereby giving a diameter of 12 to 18 inches. The density of the wrinkles can be varied along the joined perimeter 51 to form an asymmetric airbag cushion as shown in FIG. 3. For example, the wrinkles at or around the bottom 6 o'clock position can be squeezed more than other portions to further shrink the radius of the airbag cushion after inflation.

Figure 6:
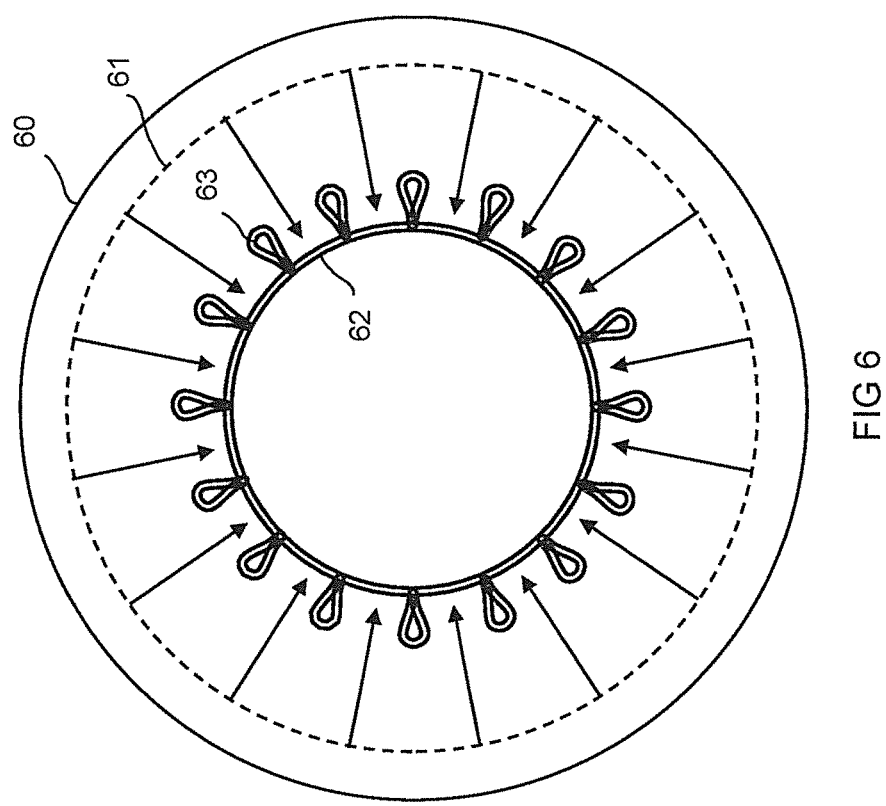
FIG. 6 is a front view of an embodiment of the present invention, illustrating an approach to creating the spool shape airbag cushion of the present invention in which the diameter of the front and rear panels of the airbag cushion are reduced by multiple pleats that are sewn along the perimeter.

FIG. 6 illustrates another approach for shrinking the joined perimeter of a traditional airbag cushion to form a spool airbag of the present invention, such as shown in FIG. 2. The front and rear panels 60 are overlapped on a flat surface and stitched together along a sewing line 61. A portion of the overlapped panels along the perimeter 61 is stitched to form a pleat 63, which shrinks the circumference every time the pleat is created. A group of pleats can be formed along the perimeter at every 15, 22.5, 30, 45, 60, or 90 degrees, or at a certain distance that is preferably evenly distributed. The action of creating multiple pleats 63 can shrink the diameter of the front and rear panels along the joined perimeter 61 to a size of the steering wheel 62.

Figure 7B:
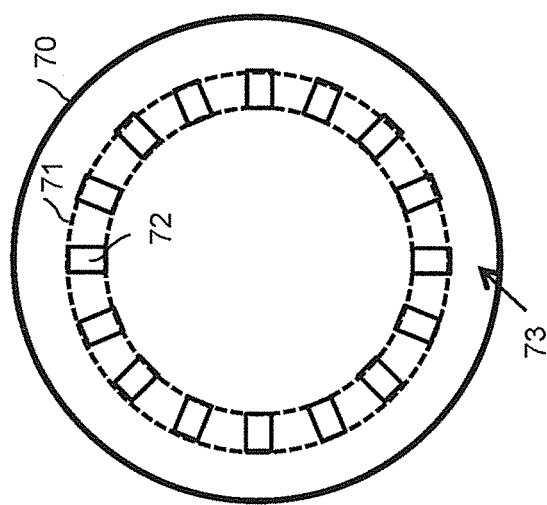
FIG. 7B is a front view of the embodiment of FIG. 7A.
Figure 7A:
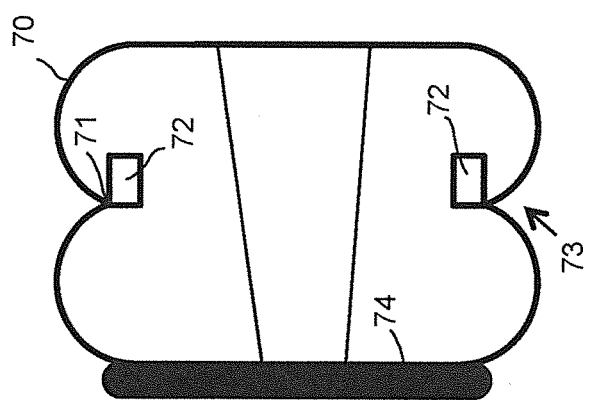
FIG. 7A is a cross sectional side view of an embodiment of the present invention in which the airbag cushion is using the approach shown in FIG. 6.

FIG. 7A shows a side view and FIG. 7B shows a front view of an embodiment of the present invention in which the airbag cushion 70 is formed using the approach illustrated in FIG. 6. The airbag cushion 70 has a recess area 73 along the joined perimeter 71. The recess is created by a group of pleats 72 that are created along the sewing line 71. The pleats may have shapes different than illustrated. The diameter of a circle created by the pleats is approximately the size of a steering wheel 74 (~15 inches) to foam a spool shape airbag cushion 70. The size or spacing of the pleats can be varied along the perimeter 71 to form an asymmetric airbag cushion such as shown in FIG. 3. For example, the pleats at or around the bottom 6 o'clock position can be sized larger or spaced more narrowly than other portions to further shrink the radius of the airbag cushion after inflation.

Figure 8B:
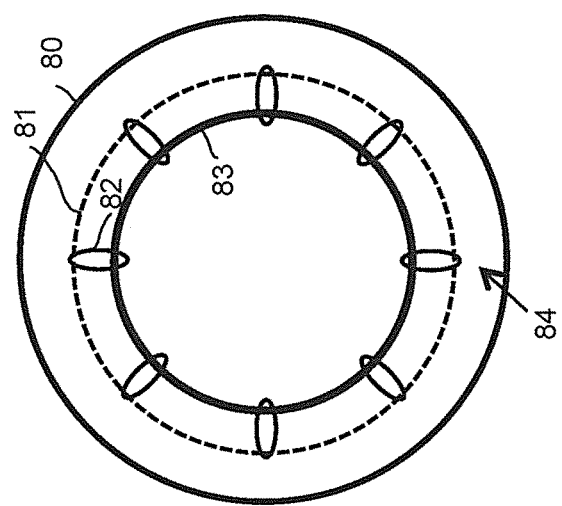
FIG. 8B is a front view of the embodiment of FIG. 8A.
Figure 8A:
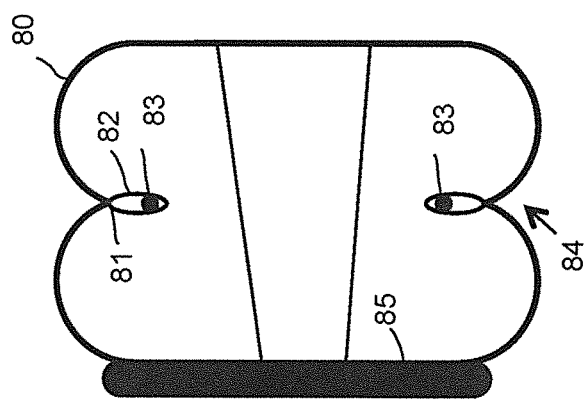
FIG. 8A is a cross sectional side view of another embodiment of the present invention in which the airbag cushion diameter is reduced by a rope that goes through multiple hooks that are attached to the perimeter.

FIGS. 8A and 8B show another embodiment of the present invention in which the spool shape airbag cushion 80 is formed by a rope 83 and multiple hooks 82. The hooks are attached to the joined perimeter 81 where the front and rear panels are joined by a single stitching line 81. The length of the rope is much shorter than the circumference of the joined perimeter such that it shrinks the airbag cushion diameter at the joined perimeter to a size of approximately a steering wheel 85. The multiple hooks can be distributed along the perimeter at every 15, 22.5, 30, 45, 60, or 90 degrees, or in a similar manner. The multiple hooks may be stitched permanently to the rope to prevent a free movement. The hooks may be spaced more narrowly or sized smaller at the bottom than other portions, which will further reduce the radius at the bottom 6 o'clock and generate an asymmetric spool airbag, such as shown in FIG. 3. The hooks 82 may take a variety of forms, such as the rings illustrated.

Figure 9B:
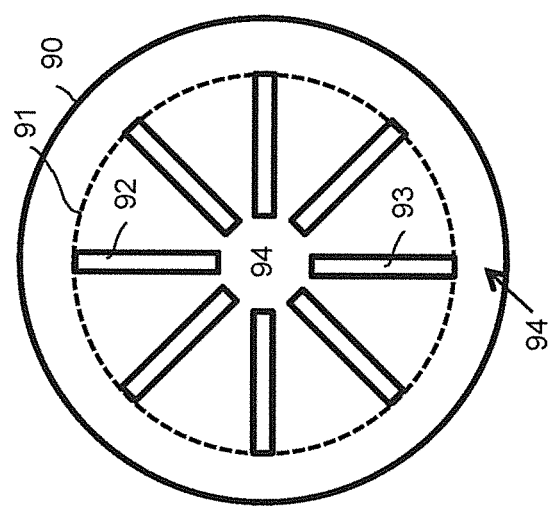
FIG. 9B is a front view of the embodiment of FIG. 9A.
Figure 9A:
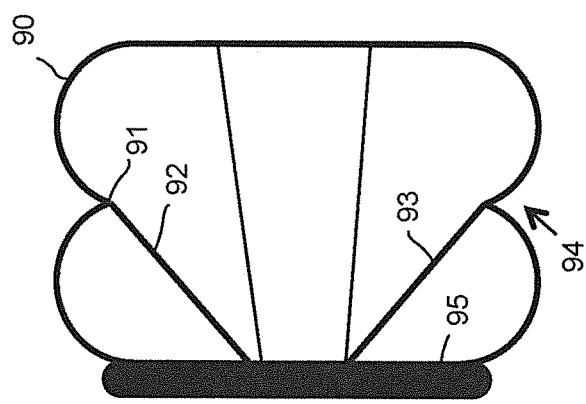
FIG. 9A is a cross sectional side view of another embodiment of the present invention in which the airbag cushion diameter is reduced along the perimeter by multiple short tethers that are connected between the inflator region and the perimeter of the joined front and rear panels.

FIGS. 9A and 9B show an additional embodiment of the present invention in which the spool shape airbag cushion 90 is formed by multiple short tethers 92. The short tethers are attached on one end at the inflator region 94 and on the other end at the joined perimeter 91 where the front and rear panels are joined by a stitching line 91. The multiple tethers 92 are much shorter than the radius of the front and rear panels such that they shrink the airbag cushion inner diameter at the joined perimeter to a size of approximately a steering wheel 95. The multiple tethers can be distributed evenly along the perimeter at every 15, 22.5, 30, 45, 60, or 90 degrees. Alternatively, the tethers may be unevenly distributed, though even distribution is preferred. A tether or tethers 93 located at the bottom of the airbag cushion can be further shortened to decrease the radius of the airbag cushion at the bottom 6 o'clock position and generate an asymmetric airbag cushion shown in FIG. 3.

As will be clear to those of skill in the art, the herein disclosed and described embodiments of the present invention may be altered in various ways without departing from the scope or teaching of the present invention. It is the following claims, including all equivalents, which define the present invention.

I claim:

1. A driver airbag cushion for installation in a steering wheel of an automotive vehicle, the driver airbag cushion comprising:
    a front panel facing a driver, the front panel having a central region and a perimeter;
    a rear panel opposite to the front panel, the rear panel having a central region with an inflator hole, the rear panel having a perimeter joined to the perimeter of the front panel so as to form the airbag cushion with a joined perimeter;
    the airbag cushion being shrunken inwardly along an entirety of the joined perimeter so as to form a recess outside the airbag cushion along the entirety of the joined perimeter after full inflation, the recess along the entirety of the joined perimeter reducing a volume of the airbag cushion by at least 10% as compared to an airbag cushion without the inwardly shrunken joined perimeter, the shrunken airbag cushion being generally spool-shaped when fully inflated;
    wherein a portion of the airbag cushion along the joined perimeter is shrunken inwardly more than other portions when the airbag cushion is fully inflated such that the recess outside the cushion along the joined perimeter is asymmetric across a central line extending from a left 9 o'clock position through a right 3 o'clock position, the portion of the airbag cushion that is more shrunken inwardly being at a bottom 6 o'clock or at a top 12 o'clock position when the corresponding steering wheel is in a straight-ahead position, the portion of the airbag cushion that is more shrunken inwardly further reducing the volume of the airbag cushion.

2. The driver airbag cushion according to claim 1, the recess along the entirety of the joined perimeter reduces the volume of the airbag cushion by at least 20% as compared to the airbag cushion without the inwardly shrunken joined perimeter.

3. The driver airbag cushion according to claim 1, wherein a diameter of the shrunken airbag cushion along the joined perimeter is similar to a diameter of a steering wheel into which the airbag cushion is installed.

4. The driver airbag cushion according to claim 1, wherein a diameter of the shrunken airbag cushion at any location along the joined perimeter is at least 10% smaller than a diameter of the steering wheel into which the airbag cushion is installed.

5. The driver airbag cushion in accordance with claim 1, wherein the front panel and the rear panel are joined by stitching, the stitching further forming pleats in the airbag cushion along the joined perimeter, the pleats shrinking the joined perimeter.

6. The driver airbag cushion in accordance with claim 5, wherein the pleats are evenly sized and distributed along the joined perimeter at every 15, 30, 45, 60, or 90 degrees.

7. The driver airbag cushion in accordance with claim 1, wherein:
    the airbag cushion has a plurality of hooks attached along the joined perimeter; and
    further comprising a short rope that goes through the multiple hooks, the short rope shrinking the perimeter.

8. The driver airbag cushion in accordance with claim 7, wherein the plurality of hooks are evenly located at every 15, 22.5, 30, 45, 60, or 90 degrees.

9. The driver airbag cushion in accordance with claim 7, wherein the plurality of hooks are permanently stitched to the short rope to prevent a free movement during and after inflation.

10. The driver airbag cushion in accordance with claim 1, further comprising a plurality of short tethers each having one end attached at the central region of the rear panel and another end attached at the joined perimeter, the tethers shrinking the joined perimeter.

11. The driver airbag cushion in accordance with claim 10, wherein the plurality of short tethers are evenly located at every 15, 30, 45, 60, or 90 degrees.

12. A driver airbag cushion for installation in a steering wheel of an automotive vehicle, the driver airbag cushion comprising:
    a front panel facing a driver, the front panel having a central region and a perimeter;
    a rear panel opposite to the front panel, the rear panel having a central region with an inflator hole, the rear panel having a perimeter joined to the perimeter of the front panel so as to form the airbag cushion with a joined perimeter, the airbag cushion having an outer sewing line and an inner sewing line along the joined perimeter with a space defined therebetween;
    a short rope extending along the joined perimeter through the space between the outer and inner sewing lines;
    the short rope shrinking the joined perimeter of the airbag cushion inwardly along an entirety of the joined perimeter so as to form a recess outside the airbag cushion along the entirety of the joined perimeter after full inflation to reduce airbag volume;
    wherein a portion of the airbag cushion along the joined perimeter is shrunken inwardly more than other portions such that the recess outside the cushion along the joined perimeter is asymmetric, the portion of the airbag cushion that is more shrunken inwardly being at a bottom 6 o'clock or at a top 12 o'clock position when the corresponding steering wheel is in a straight-ahead position.

13. The driver airbag cushion in accordance with claim 12, wherein the short rope has length that is similar to a circumference of the steering wheel into which the airbag cushion is installed.

14. The driver airbag cushion in accordance with claim 12, wherein the short rope has a length that is significantly smaller than a circumference of the steering wheel into which the airbag cushion is installed.

15. A driver airbag cushion for installation in a steering wheel of an automotive vehicle, the driver airbag cushion comprising:
  a front panel facing a driver, the front panel having a central region and a perimeter;
  a rear panel opposite to the front panel, the rear panel having a central region with an inflator hole, the rear panel having a perimeter joined to the perimeter of the front panel so as to form the airbag cushion with a joined perimeter;
  a short rope extending along and attached to the joined perimeter, the short rope shrinking an entirety of the joined perimeter inwardly so as to form a recess outside the airbag cushion along the joined perimeter after full inflation to reduce airbag volume;
  wherein a portion of the airbag cushion along the joined perimeter is shrunken inwardly more than other portions such that the recess outside the cushion along the joined perimeter is asymmetric across a central line extending from a left 9 o'clock position through a right 3 o'clock position, the portion of the airbag cushion that is more shrunken inwardly being at a bottom 6 o'clock or at a top 12 o'clock position when the corresponding steering wheel is in a straight-ahead position.

16. The driver airbag cushion according to claim 15, wherein the airbag cushion has an outer sewing line and an inner sewing line along the joined perimeter with a space defined therebetween, the short rope extending through the space between the outer and inner sewing lines.

17. The driver airbag cushion in accordance with claim 15, wherein:
  the airbag cushion has a plurality of hooks attached along the joined perimeter, the short rope extending through the plurality of hooks.

18. A driver airbag cushion for installation in a steering wheel of an automotive vehicle, the driver airbag cushion comprising:
  a front panel facing a driver, the front panel having a central region and a perimeter;
  a rear panel opposite to the front panel, the rear panel having a central region with an inflator hole, the rear panel having a perimeter joined to the perimeter of the front panel so as to form the airbag cushion with a joined perimeter;
  a short rope extending along the joined perimeter, the short rope shrinking the joined perimeter of the airbag cushion inwardly along an entirety of the joined perimeter so as to form a recess outside the airbag cushion along the entirety of the joined perimeter after full inflation to reduce airbag volume;
  wherein at least a portion of the airbag cushion along the joined perimeter is shrunken inwardly more than other portions, the at least one portion of the airbag cushion that is more shrunken inwardly being at a bottom 6 o'clock or at a top 12 o'clock position when the corresponding steering wheel is in a straight-ahead position.

* * * * *